May 26, 1942.    S. H. CALDWELL    2,284,040
SIGNAL
Filed June 19, 1939

INVENTOR.
STUART H. CALDWELL
BY
ATTORNEYS

Patented May 26, 1942

2,284,040

UNITED STATES PATENT OFFICE 2,284,040

SIGNAL

Stuart H. Caldwell, Detroit, Mich., assignor to Kelch Heater Company, Detroit, Mich., a corporation of Michigan Application June 19, 1939, Serial No. 279,957

6 Claims. (Cl. 177—324)

The present invention relates to a signal, and more particularly to a tactual signal designed to impart sensible impulses through a control pedal to the foot of an operator. In the past it has been proposed to signal the operator of a motor vehicle, or the like, by transmitting a tactual signal to a portion of his anatomy. The present application is a continuation in part of my copending application, Serial No. 98,810, filed August 31, 1936, which issued January 2, 1940, as Patent No. 2,185,329.

The present invention contemplates an improved foot pedal, such for example as the accelerator pedal of an automobile. The pedal is modified from ordinary construction by the provision of an aperture through the relatively heavy metallic frame, usually found therein. The signal takes the form of means for transmitting hammer blows or impulses to the foot of an operator through the aperture referred to.

It has been found convenient to employ a solenoid as the motor for originating the signal, although, as will be evident, any convenient source of energy could be utilized.

Various refinements of the broad idea are contemplated, as for example, the provision of a relatively light small plate preferably imbedded in the rubber tread normally secured to the frame of the pedal. This plate may be completely imbedded within the rubber tread, or it may be imbedded in the upper surface of the rubber tread, having its upper surface flush with the upper surface of the rubber tread.

One of the essential objects of the invention is to provide safety equipment of a compact nature wherein warning impulses may be transmitted to a resilient tread of an accelerator pedal by means of a bell crank lever extending through the frame of the pedal and actuable by a solenoid disposed upon the underside of the pedal with the axis of the solenoid substantially parallel to the frame of the pedal.

Another object is to provide equipment of the type mentioned wherein the frame and resilient tread of the pedal are fixed or bonded to one another and wherein the bell crank lever extending through the frame of the pedal is capable of imparting with increased intensity and effectiveness the warning impulses to the resilient tread of the pedal.

Another object is to provide equipment wherein the parts are so constructed and arranged that the minimum of power is necessary for its operation.

Another object is to provide equipment that is economical to manufacture, easy to install, and that is positive and reliable in operation.

It is a further object of the present invention to provide an improved tactual signal comprising a pedal having an apertured main frame or body member for use with a signal of the type described.

It is a further object of the present invention to provide in combination, an apertured pedal member and a resiliently supported plate adjacent the aperture in the pedal member.

Other objects of the invention will be apparent as the description proceeds, and when taken in conjunction with the accompanying drawing wherein.

In all of the illustrated embodiments, I have chosen to show a foot pedal of the type normally employed in automotive vehicles as an accelerator pedal. Pedals of this type are normally pivoted at their rear end and have connected to their forward end a link or other connection for actuation of the throttle of a motor.

The present invention is adapted to cooperate with a pedal of this type to impart a sensible signal to the foot of the operator in a manner adapted to call his atttention to some condition, such for example as the speed of the vehicle. It is desirable in signals of this type to provide for attracting the attention of the driver without in any way distracting his attention from his duties as driver of the vehicle. A tactual signal is preferred for this reason to the type of signal which involves a light, or an audible signal. As will be readily apparent, flashing on of a light serves to distract the driver's attention from the road, and in addition is annoying to other occupants of the car besides the driver. Substantially the same objections apply to an audible signal, such as a bell or buzzer.

It is further essential that a speed signal shall in no way interfere with the normal operation of the vehicle. Thus, for example, where the signal is employed to indicate attainment of a predetermined speed, it is desirable to attract the driver's attention to this fact without in any way interfering with his control of the vehicle. Speed control devices previously known are objectionable for the reason that it may be essential to the safety of the driver to continue above a predetermined speed, or even to accelerate for short periods.

The present invention is well adapted to fulfill all of the requirements outlined above. The signal is inaudible, and it is preferred to so proportion the parts and to select the power of the motor means that the driver's attention is attracted in what may be termed a gradual manner. As is readily apparent, the signal in no way interferes with the operation of the vehicle, and if the driver desires, he may continue above a predetermined speed for long intervals.

Figure 1:
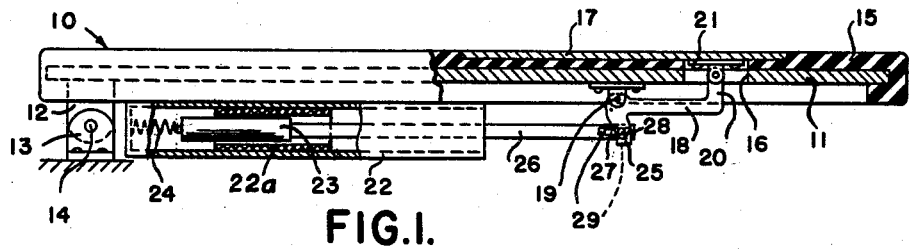
Figure 1 is a side elevation, partly in section, of a preferred embodiment of my invention.

Referring now particularly to Figure 1, I have illustrated at 10 an accelerator pedal comprising a metallic frame 11 which is generally rectangular and of substantial thickness. Plate 10 has secured thereto, or formed integral therewith, a lug 12 which is adapted to cooperate with a bracket 13 for supporting the pedal 10 for movement about a pivot axis indicated at 14. At the present time it is common practice to provide a relatively thick tread portion indicated at 15, which may be of a suitable rubber composition. The tread 15 may conveniently be vulcanized in place about the frame 11.

According to the present invention, I provide an aperture 16 in the frame 11 through which the signal is imparted. As shown in Figure 1, I provide a relatively small, lightweight, preferably metallic, plate 17 which is imbedded in the upper surface of the tread 15. As shown in this figure, the upper surface of the plate 17 is flush with the upper surface of the tread 15. If desired, the upper surface of the tread 15 and the plate 17 may be corrugated, or otherwise provided with a non-slip surface.

In order to transmit hammer-like blows or impulses to the foot of the operator, I provide a bell crank 18, pivoted to a bracket 19 carried by the underside of the frame 11. The bell crank 18 has formed at one end thereof an upper projection 20 which is adapted to be secured to the underside of the plate 17 as by a bracket 21. I have indicated the connection between the bracket 21 and the portion 20 as being a pivotal connection, although this is not strictly necessary since the movement of the parts is extremely limited.

Beneath the pedal 10, and preferably secured directly to the underside of the frame 11, I provide a motor, such for example as a solenoid 22. The solenoid may conveniently be energized from the conventional storage battery, which is part of the standard equipment of a motor vehicle. Solenoid 22 has a plunger or core 23 axially movable therein. In some instances, depending upon the attitudes of the pedal in use, it may be desirable to employ a spring indicated at 24 for moving the plunger 23 to one limiting position. The spring 24 will be either a compression or tension spring, depending upon the position of the plunger 23 relative to the windings 22a of the solenoid coil.

The plunger 23 is connected to a depending arm 25 of the bell crank 18 by a link 26. In this figure I have illustrated this connection as formed by an elongated slot 27 provided at the end of the link 26. The depending arm 25 of the bell crank 18 may be a single member or may be bifurcated, but in either event, a pin 28 is provided which is relatively slidable in the slot 27.

As previously stated, it is desirable that this type of signal be inaudible, and for this purpose I provide at each end of the slot 27 bumper members 29 which may be resilient, such as rubber, or which may be formed of leather, or the like. These bumper members prevent engagement between the pin 28 and the ends of the slot from causing a sound which would be audible to the occupants of the vehicle.

The solenoid is supplied with interrupted current from a storage battery or other source of energy of the vehicle when the speed of the vehicle exceeds a predetermined value as set forth in my Patent No. 2,185,329.

By the construction just defined, intermittent energization and deenergization of the solenoid 22 will impart a series of blows or impulses to the foot of the operator. The aperture 16 is preferably provided centrally of the pedal 10 and in a position constantly engaged by the foot of the operator. Movement of the plunger 23 to the right from the position shown in Figure 1, results in a relative shifting movement of the link 26 to the bell crank 18 until the pin 28 is engaged by the bumper 29. At this time plunger 23 has a substantial momentum, and the result will be a hammer-like blow imparted upwardly to the plate 17 and thence to the foot of the operator through the lever 18.

Figure 2:
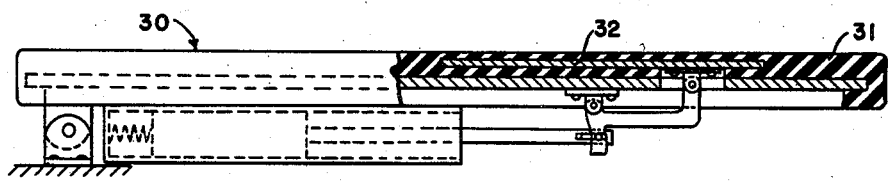
Figure 2 is a side elevation, partly in section, of another embodiment of my invention.

In Figure 2 I have illustrated a somewhat modified construction, which will not be described in detail except to point out the points of difference. In this modification the pedal 30 is provided with a tread portion 31 of rubber, or the like. A plate 32, which is preferably relatively small and of metal, is completely imbedded within the tread 31. By this arrangement the upper surface of the tread is completely covered with the tread material, which may be formed to have anti-skid characteristics or to present a pleasing appearance, as desired. The remaining parts are precisely as described in Figure 1, and accordingly are not described in detail.

Figure 3:
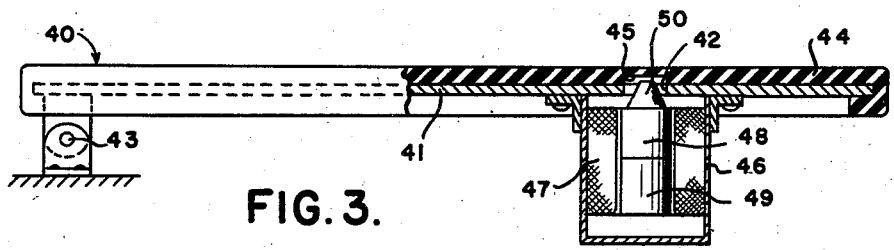
Figure 3 is a side elevation, partly in section, of yet another embodiment of my invention.

In Figure 3 I have illustrated a somewhat different embodiment of my invention. In this figure a pedal 40 comprises a relatively heavy flat metallic plate 41, apertured as indicated at 42. The plate 40 is pivotally mounted at its rear end as indicated at 43. A tread 44, which is preferably a rubber composition of substantial thickness, overlies and envelops the edges of plate 41. In this figure I have illustrated the tread as slightly recessed, as indicated at 45, but the provision of this recess is by no means essential. On the other hand, in some instances it is possible to provide an aperture completely through the tread so that a suitable plunger member may engage directly against the bottom of the foot of the operator. I have not illustrated such a construction, since it will be readily apparent that it would differ only from the construction of Figure 3 by the provision of an aperture rather than a recess 45.

Carried by the underside of the plate 41 is a solenoid housing 46 in which is a winding 47. Vertically movable in the winding 47 is a core or plunger comprising an upper section 48 formed of a non-ferrous material, a lower portion 49 formed of ferrous material and an upper striker portion 50, which is preferably of a resilient nature, such for example as leather, rubber, or the like. With this construction, it is normally unnecessary to provide the tension spring for returning the plunger to lowermost position, but if desired such a spring may be employed.

Upon energization of the coil 47, the plunger is projected forcibly upward so that the striker portion 50 engages the rubber of the tread 44 directly over the aperture 42. The rubber, being resilient, readily transmits the impulse to the foot of the operator. In the event that an aperture is provided, the plunger 50 strikes directly against the foot of the operator. It will be understood that when an aperture completely through the pedal structure is employed, the plunger will be of a size such that it cannot pass completely through the aperture.

Figure 4:
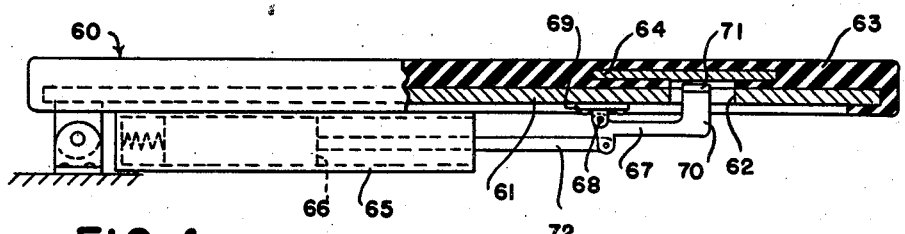
Figure 4 is a side elevation, partly in section, of yet another embodiment of my invention.
Figure 5:
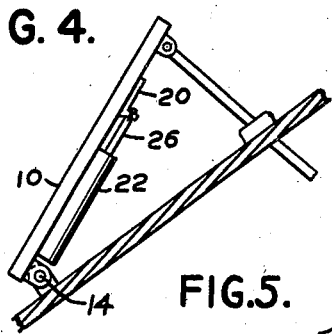
Figure 5 is a fragmentary side elevation, partly in section, of a foot pedal attached to a control rod and mounted on the floor board of an automobile.

Referring now more particularly to Figure 4, I have illustrated a pedal 60 comprising a metal frame 61 having an aperture 62 formed therein. Directly over the aperture 62 and imbedded in the rubber composition of a tread member 63 is a metal plate 64. A solenoid 65 is secured to the underside of the frame 61 and is provided with a core or plunger 66. Also carried by a bracket 69 at the underside of the frame 61 is a bell crank lever 67 pivoted as indicated at 68 to the bracket 69. The bell crank 67 is provided with a relatively heavy hammer portion 70, which may, if desired, be provided with a striker pad 71 of leather or the like. The plunger 66 is connected to one arm of the bell crank 67 by a link 72.

The operation of this embodiment of the invention is obvious from the foregoing description, but will be briefly reviewed. Intermittent energization of the solenoid causes reciprocation of the plunger 66, a suitable spring being provided for return of the plunger. The reciprocating motion of the plunger is transmitted to the bell crank 67 by the link 72 and is transformed into a substantially vertical striking movement of the hammer portion 70. Provision of the pad 71 insures that the resulting signal will be inaudible. The plate 64 being mounted in the resilient rubber composition of the tread 63, readily transmits the impulses to the foot of the operator.

It is desirable that the arrangement of parts be such that the impulses will be substantially spaced. It has been found that where the frequency is such that a substantially vibratory action results, the signal loses much of its effectiveness. As previously stated, it is oftentimes desirable to continue operation of the vehicle above the predetermined speed for a substantial interval. Under these circumstances it has been found that the driver of the vehicle soon becomes accustomed to the vibration unless it is of the undesirable intensity.

I have illustrated four specific embodiments of my invention, all of which are characterized by their simplicity and by the fact that they may be carried out with a minimum of alterations on conventional automotive structures. All are further characterized by the provision of an aperture in the frame of the pedal so that the signal will be transmitted with substantially increased intensity therethrough. While it is of course possible to provide a signal of this broad type, operable through the relatively heavy frame of the pedal, the present construction produces a much more effective signal and, due to the use of lighter parts, reduces the cost of the device, and in addition reduces the power necessary for its operation.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. In a signal, a pedal having an elongated metal frame and a resilient tread upon the upper surface of said frame and bonded thereto, the frame having an opening through the bottom thereof to the resilient tread, a solenoid on the underside of the pedal with the axis thereof substantially parallel to the elongated frame of the pedal, and means actuable by the solenoid for transmitting warning impulses to the resilient tread, including a member movable in the opening aforesaid in the frame of the pedal.

2. In a signal, a pedal having an elongated metal frame and a resilient tread upon the upper surface of said frame and bonded thereto, the frame having an opening through the bottom thereof to the resilient tread, a solenoid on the underside of the pedal with the axis thereof substantially parallel to the elongated frame of the pedal, and means actuable by the solenoid for transmitting warning impulses to the resilient tread, including a bell crank lever having an arm thereof extending upwardly in the opening aforesaid in the frame of the pedal.

3. In a signal, a pedal having an elongated metal frame and a resilient tread upon the upper surface of said frame and bonded thereto, the frame having an opening through the bottom thereof to the resilient tread, a solenoid on the underside of the pedal with the axis thereof substantially parallel to the elongated frame of the pedal, and means actuable by the solenoid for transmitting warning impulses to the resilient tread, including a bell crank lever pivoted upon the underside of the frame of the pedal and having one arm thereof extending upwardly in the opening in said frame, and an operating link terminally connected to the solenoid and to the other arm of the bell crank lever.

4. In a signal, a pedal having an elongated metal frame and a resilient tread upon the upper surface of said frame and bonded thereto, a metal plate embedded in said resilient tread, the frame being provided beneath the embedded plate with an opening extending from the underside of the frame to the resilient tread, the tread having a recess registering with and extending from the opening in the frame to the embedded plate, a solenoid on the underside of the pedal, and means actuable by the solenoid for transmitting warning impulses to the resilient tread, including a member movable in the opening in the frame of the pedal and in the recess in the tread.

5. In a signal, a pedal having an elongated metal frame and a resilient tread upon the upper surface of said frame and bonded thereto, a metal plate embedded in said resilient tread, the frame being provided beneath the embedded plate with an opening extending from the underside of the frame to the resilient tread, the tread having a recess registering with and extending from the opening in the frame to the embedded plate, a solenoid on the underside of the pedal, and means actuable by the solenoid for transmitting warning impulses to the resilient tread, including a bell crank lever having an arm thereof extending upwardly in the opening in the frame of the pedal and in the recess in the tread and operatively connected to the embedded plate.

6. In a signal, a pedal having an elongated metal frame and a resilient tread upon the upper surface of said frame and bonded thereto, a metal plate embedded in said resilient tread, the frame being provided beneath the embedded plate with an opening extending from the underside of the frame to the resilient tread, the tread having a recess registering with and extending from the opening in the frame to the embedded plate, a solenoid on the underside of the pedal, and means actuable by the solenoid for transmitting warning impulses to the resilient tread, including a bell crank lever pivoted upon the underside of the frame of the pedal and having one arm thereof extending upwardly in the opening in said frame and in the recess in the tread and operatively connected to the embedded plate, and an operating link terminally connected to the solenoid and to the other arm of the bell crank lever.

STUART H. CALDWELL.